V. LINK.
UNIT ASSEMBLAGE OF MOTOR ADJUNCTS.
APPLICATION FILED FEB. 14, 1920.
1,422,995.
Patented July 18, 1922.
6 SHEETS—SHEET 1.
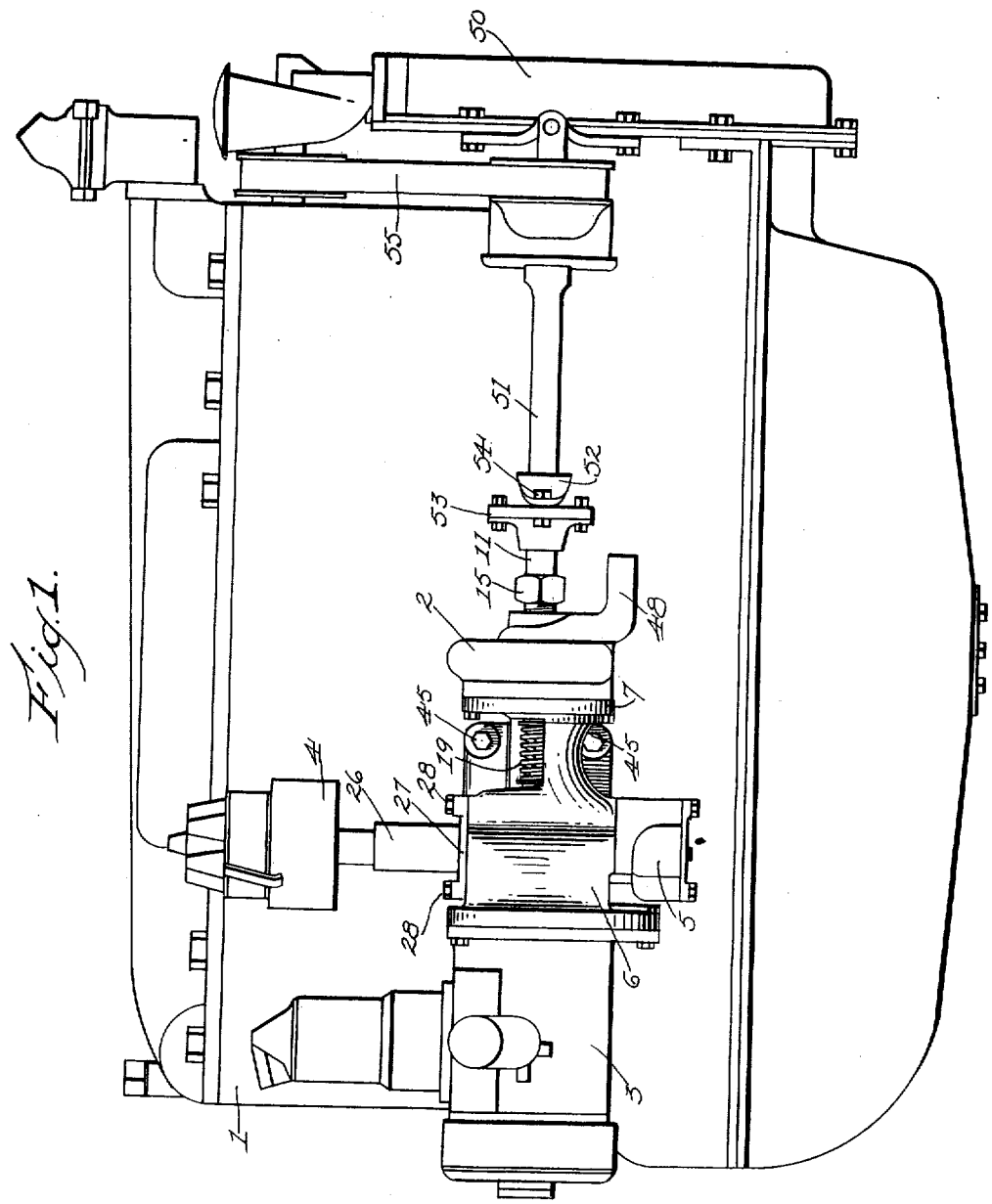
INVENTOR
Vincent Link
ATTORNEYS

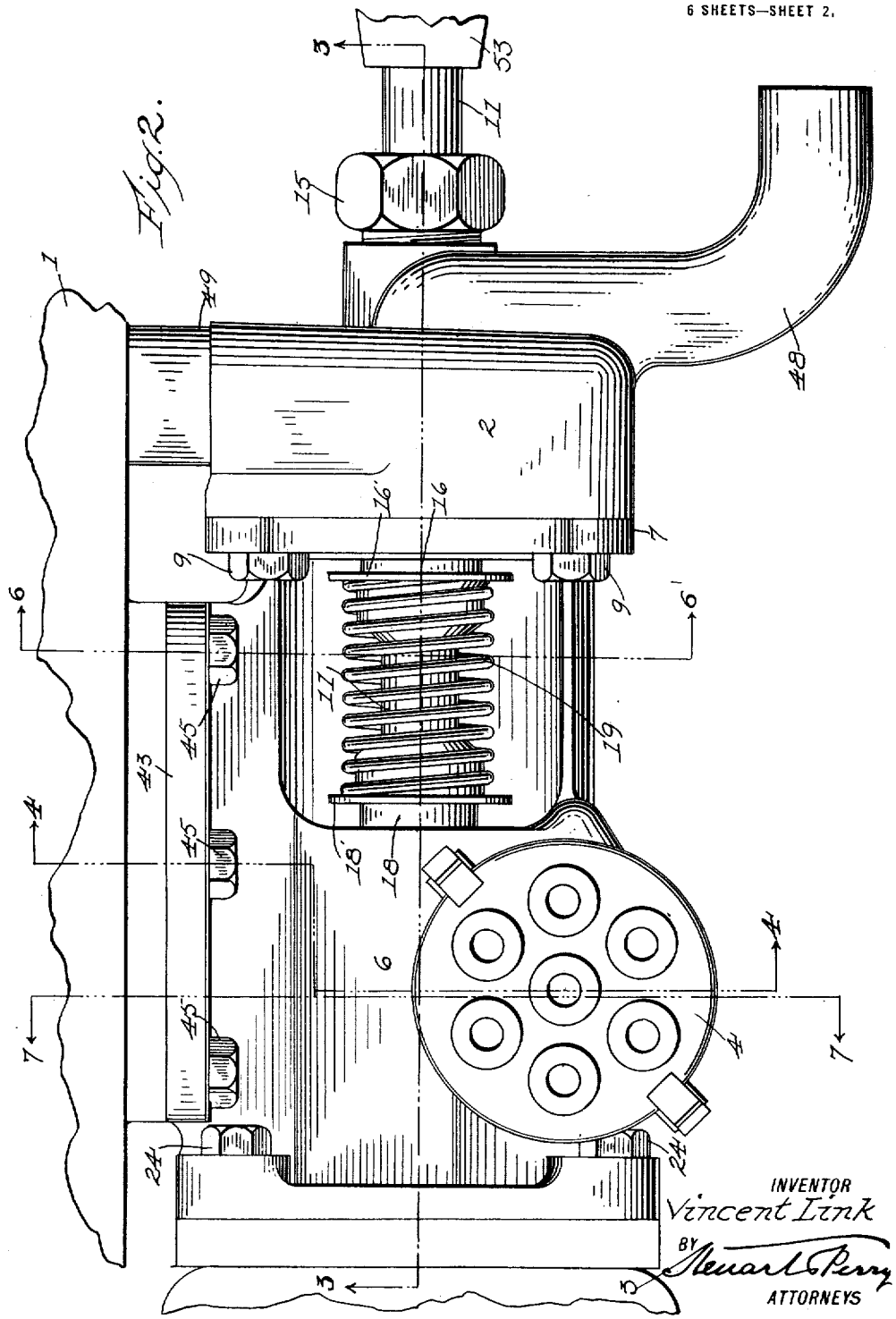

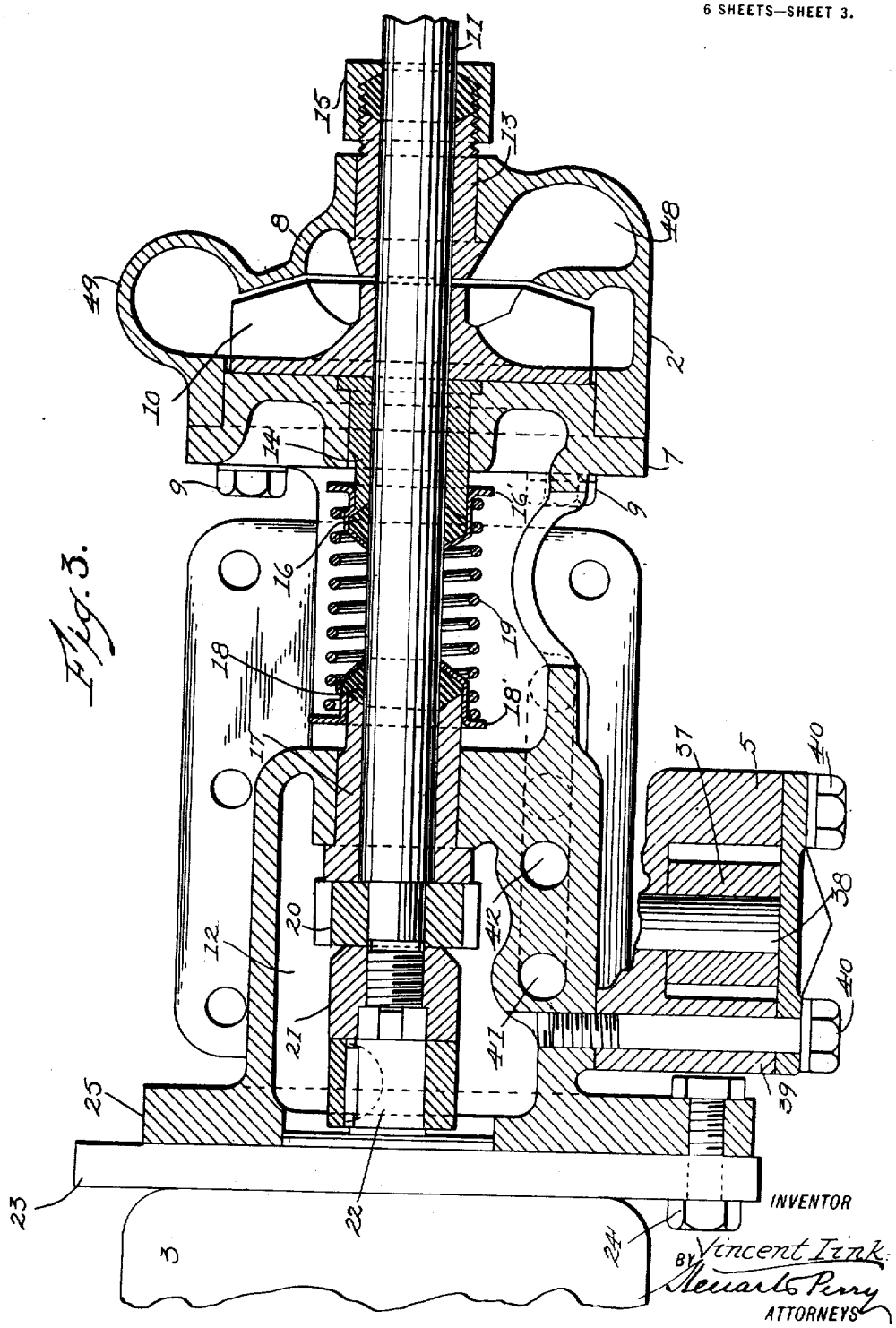

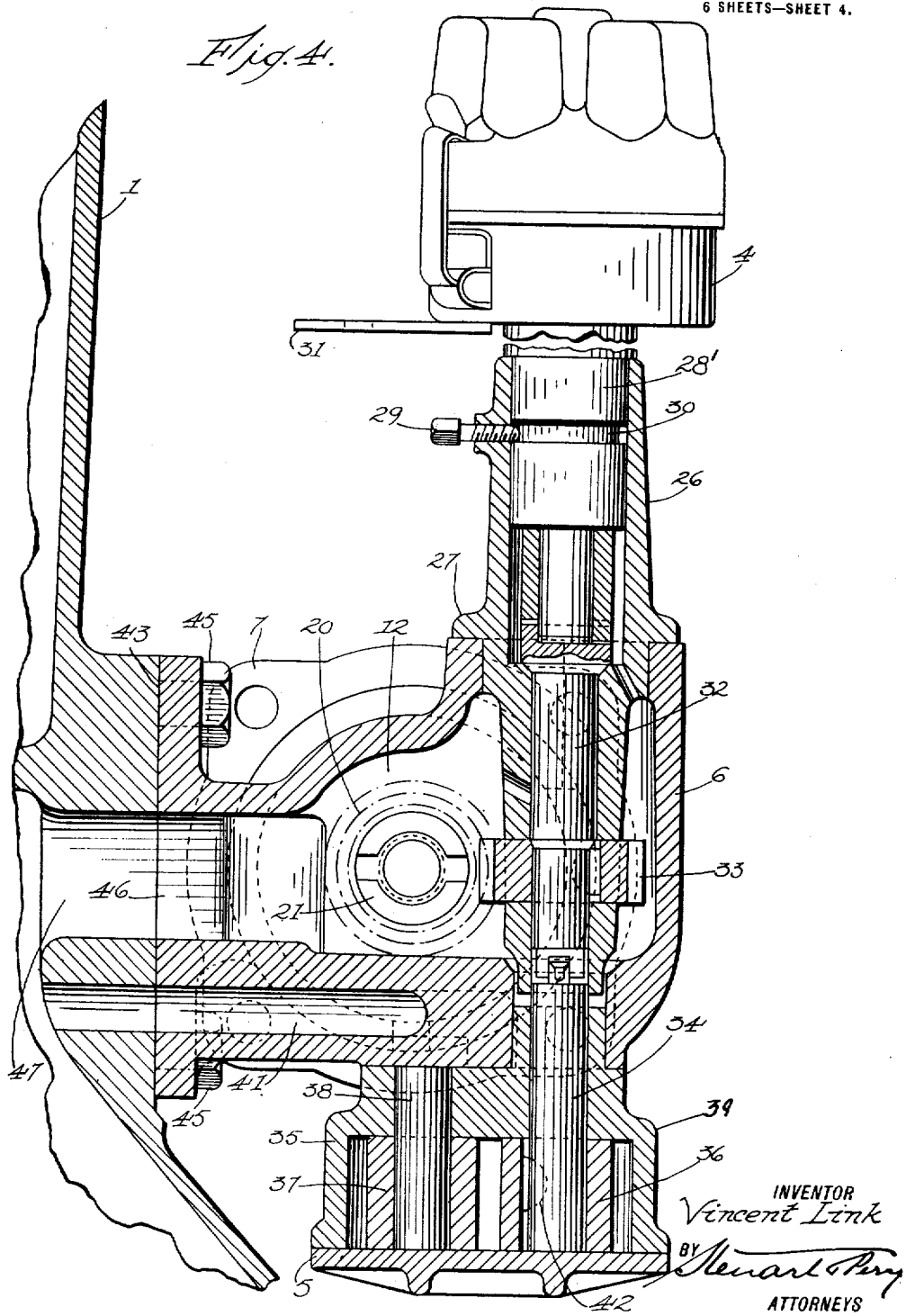

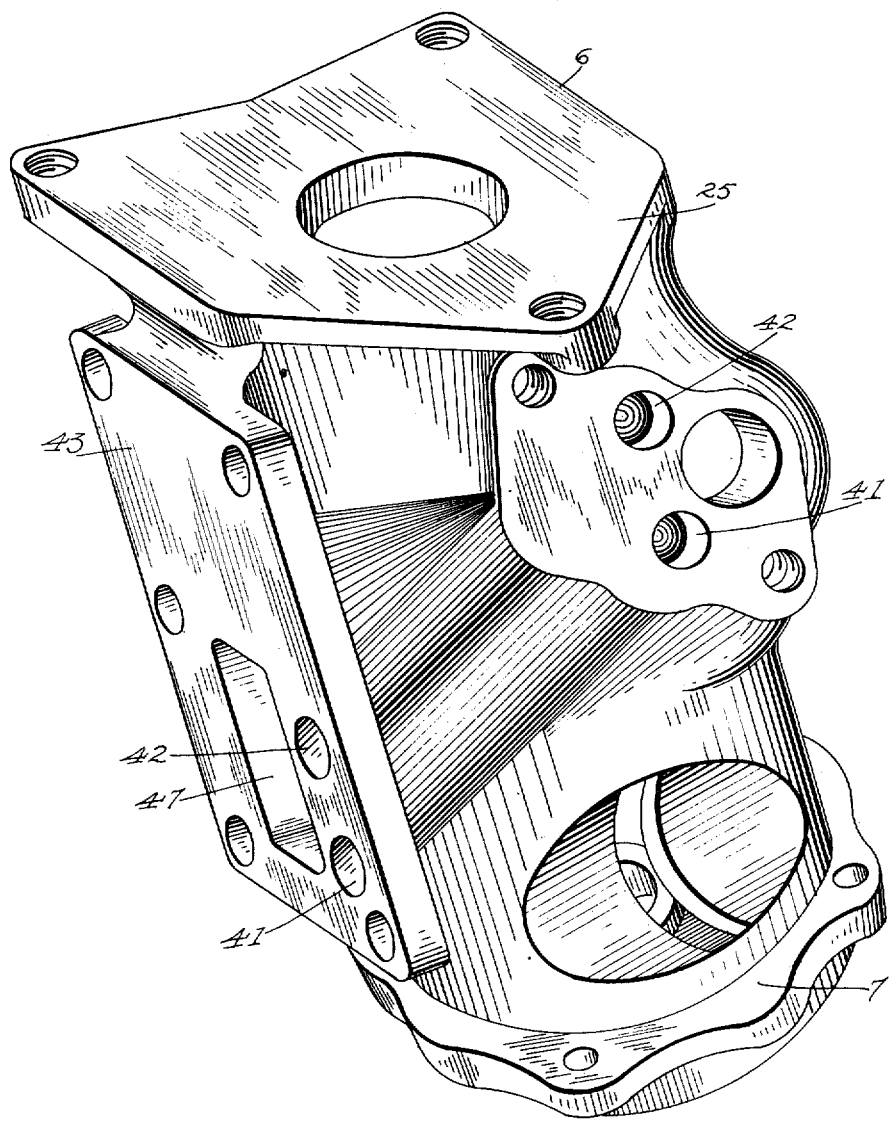

V. LINK.
UNIT ASSEMBLAGE OF MOTOR ADJUNCTS.
APPLICATION FILED FEB. 14, 1920.
1,422,995.
Patented July 18, 1922.
6 SHEETS—SHEET 6.
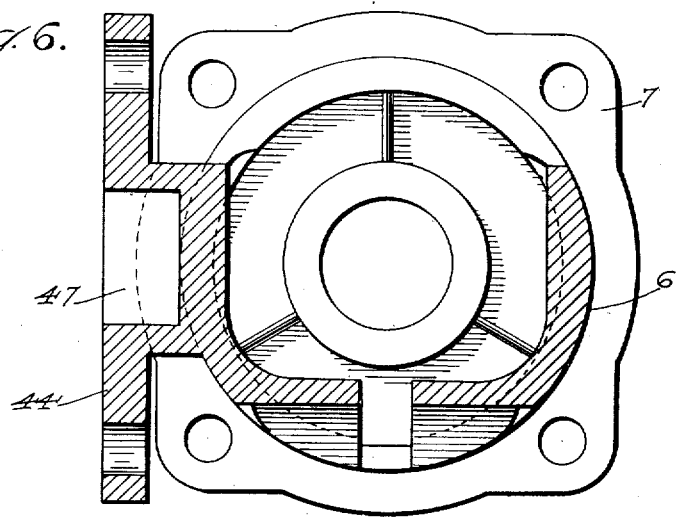
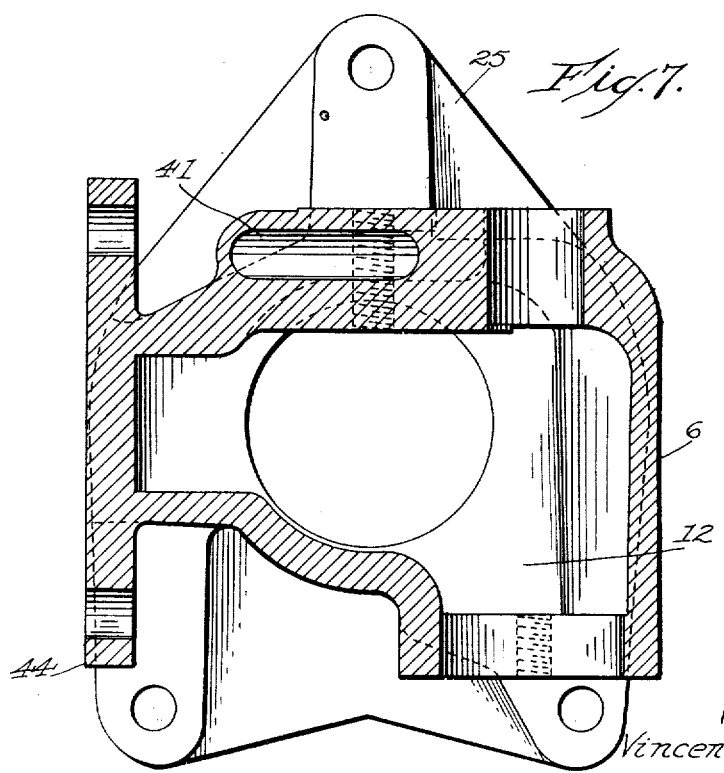
INVENTOR
Vincent Link
BY
Stewart & Perry
ATTORNEYS

UNITED STATES PATENT OFFICE.

VINCENT LINK, OF DETROIT, MICHIGAN, ASSIGNOR TO THE STUDEBAKER CORPORATION, A CORPORATION OF NEW JERSEY.

UNIT ASSEMBLAGE OF MOTOR ADJUNCTS.

1,422,995.	Specification of Letters Patent.	Patented July 18, 1922.

Application filed February 14, 1920. Serial No. 358,706.

*To all whom it may concern:*

Be it known that VINCENT LINK, a citizen of the United States of America, and resident of Detroit, in the county of Wayne and State of Michigan, has invented certain new and useful Improvements in Unit Assemblages of Motor Adjuncts, of which the following is a specification.

This invention is a unit assemblage of motor adjuncts, and has to do with the expeditious, economical, and efficient assemblage of the auxiliaries of an internal combustion engine, including, more particularly, a water pump, oil pump, electric generator, and an ignition timer.

The assignee of the invention herein is the owner of a prior patent to one James G. Heaslet, 1,237,331, August 21, 1917, "assemblage of internal combustion engines and their associated mechanisms." Prior to the invention of the Heaslet patent, it had been the practice in automobile construction to mount the various motor adjuncts in different positions on the motor, some of which were, in practice, very inaccessible, so that considerable time was required not only in the initial assemblage of the parts, but, also, in the subsequent removal or repair thereof. In accordance with the Heaslet invention, the motor adjuncts were brought together at the forward end of the motor, and were so grouped as to be driven directly from the crank shaft, through a simple train of gearing. This construction greatly facilitated the initial assemblage of the motor and rendered the parts far more accessible for removal or repair than had theretofore been feasible.

In the Heaslet invention, however, the various accessories were supported and mounted directly upon the engine and, in practice, were individually secured thereto by suitable attaching means. That is to say, the timer was supported in its individual mounting on the motor, and the same was true of the water pump, the generator, and the remaining associated devices.

While the Heaslet invention represents a distinct advance in the art, it will be apparent that because of the independent mounting of each device, such devices would necessarily require to be individually installed, the parts being successively secured to the engine and consecutively coupled up through the gear train referred to. In other words, the mounting of each part was a distinct job or operation, the main portion of the work in connection with which was done on the motor. As only a limited number of workmen can efficiently work on a motor, at any particular time, owing to the proximity of the parts thereof, the individual mounting of the several elements in succession, as described, occasioned very considerable delay in the time of output of the motors. Accordingly, the work in installing these devices was, practically, a one man job. Moreover, other men could not efficiently work on other parts of the motor, such as the cylinders or cam shafts, without interfering with each other's work.

The present invention overcomes the disadvantages specified, and others, in that it provides for the assemblage or organization of the various adjuncts on a workman's bench, in such manner that all of these adjuncts in properly assembled relation with respect to one another may be picked up as a unit, and thereafter readily positioned, as such, on the motor.

In the preferred embodiment of the invention, a unitary casting is prepared, provided with properly faced surfaces for attachment and bearings and is suitably cored out to provide a housing for the driving connections to the various parts. The casting is further preferably provided with oil ducts for properly feeding the lubricant to and from the oil pump, adapted to be associated therewith, and with additional oil ducts for circulating the lubricant about the driving connections of the device. One of the surfaces of the casting is faced to co-operate with a correspondingly faced portion of the motor, said face of the motor being tapped to allow the casting, with all the parts assembled thereon, to be expeditiously, securely and economically mounted in place upon the motor through the medium of a few machine screws.

The casting and the associated adjuncts having been mounted on the engine in the manner described, the driven parts are connected by a single counter shaft to the crank shaft of the engine through a simple gear train, and, if desired, this counter shaft may also serve to drive the fan of the motor.

Features of the invention, other than those specified, will be apparent from the hereinafter detailed description taken in conjunction with the accompanying drawings.

In the accompanying drawings, I have illustrated one practical embodiment of the invention, but the construction shown therein is to be understood as illustrative only, and not as defining the limits of the invention.

Figure 1 is a side elevation of an engine with which the present invention is associated.

Figure 2 is a plan view of a fragmental portion of the showing of Figure 1.

Figure 3 is a section on the line 3—3 of Figure 2.

Figure 4 is a section on the line 4—4 of Figure 2.

Figure 5 is a perspective view of the casting preferably employed; and

Figures 6 and 7 are sections through the casting of Figure 5 as sectioned on the lines 6—6 and 7—7, respectively, of Figure 2.

Referring to the drawings, 1 indicates a motor, here shown as a well known type of automobile or aeroplane motor. Motors of this character usually have, as adjuncts, a water pump 2 in the cooling system, a generator or magneto 3 for ignition and lighting; a combined timer and distributor 4 for distributing the electric current from the generator to the spark plugs of the respective cylinders in timed sequence, and an oil pump 5 for circulating the lubricant employed. In accordance with the present invention all of these parts, or at least such parts as are to be used on the engine with which the invention is to be associated, are adapted to be mounted on a unitary supporting member 6 which is shown separate and apart from the rest of the construction in Figure 5 of the drawings. This member 6 is preferably in the form of a casting, the shape of which is, manifestly more or less determined by the particular adjuncts which it is desired to assemble thereon and, while it may be of any material, is preferably cast in aluminum in the interest of lightness. The casting is cored out to suit requirements and is provided with properly faced flanges and surfaces adapted for co-operation with corresponding flanges and surfaces on the various adjuncts and on the motor, to produce oil tight joints, when the parts are assembled. I will now proceed to describe the assemblage of the various adjuncts on the unitary supporting element 6, and the subsequent mounting of the whole, as a unit, on the motor 1.

A water pump 2 is preferably the first device mounted on the casting 6, and, to receive this pump, the casting 6 is provided with a flange 7 which may form, as shown in Figure 3, one side of the pump casing. The other side 8 is secured thereto by screws 9, and, as the pump shown is of the centrifugal type, it is provided interiorly with a rotor 10, having suitable fan blades common to this type of pump. The rotor 10 is secured to a stub shaft 11, which passes through the pump casing and extends through the casting 6 into a gear chamber 12 formed at the other end thereof. The shaft works in bearings 13 and 14 positioned in the respective halves of the pump casing and leakage of the water from the pump 2 about the shaft is precluded by providing the bearing 13 with a stuffing box or gland of soft packing 15 and the bearing 14 with soft packing 16. The stub shaft 11 has a further bearing 17 with the casting as shown in Figure 3 and with this bearing co-operates a gland of soft packing 18 to preclude the leakage of oil adapted to be contained in the chamber 12. The glands 16 and 18 are spaced apart as shown and gland caps 16' and 18' are forced apart by an interposed spring 19 which has the function of holding the soft packing tightly to the shaft to preclude leakage as specified.

The inner end of the stub shaft 11 is stepped down to receive a worm gear 20 which is slipped on to the stepped down portion and a nut 21 thereafter screwed on to the threaded end of the shaft to hold the gear in place. The nut 21 is transversely slotted across its outer face and forms a slip clutch with which is adapted to engage an operating spindle 22 of the generator 3, so that the spindle of the generator is clearly locked against rotation to the stub shaft 11, and may be driven through such connection. The generator 3 is provided with a flange 23 which is secured by means of bolts 24 to a flange 25 formed on the casting 6.

Superimposed upon the casting 6 is a bearing 26 provided with a flange 27 by means of which it may be secured by screws 28, to said casting. The flange 27 is positioned intermediate the ends of the bearing 26 so that when the bearing is in place upon the casting 6, it projects above the top of the casting as well as downwardly into the chamber 12 thereof. The bearing 26 serves as a support for the timer and distributor 4. The stem 28' of the timer projects downwardly into the upper end of the bearing 26 and is mounted for oscillation therein, but locked against longitudinal movement relative thereto by means of a set screw 29 coacting with an annular groove 30 in the stem of the timer. The timer is provided with the usual operating arm 31 by means of which it may be oscillated to advance or retard the spark.

Extending downwardly through the stem of the timer and through the lower portion of the bearing 26 is a spindle 32 of the distributor and near the lower end of said spindle is affixed a worm gear 33 which meshes with a worm gear 20. The distributor is driven from the shaft 11 through these worm gears.

The lower end of the spindle 32 is transversely slotted to engage with the complementarily shaped upper end of the spindle 34 of an oil pump 35. The said two spindles are thus locked together for rotation and the spindle of the timer serves to drive the spindle of the oil pump. The oil pump may be of any well known construction but is here shown as of the well known gear type. One of the gears 36 is fixed on the driving spindle 34 and the other gear 37 is rotatable on a stud 38. Both of the gears in question are positioned within a casing 39 which is secured, by means of screws 40, to the under side of the casting 6. The inlet and outlet of the oil pump 5 are in the form of ducts 41 and 42 respectively, which are cored out of the casting 6 and the casing 35 of the pump and lead to a faced surface 43 with which the casting is provided.

The faced surface 43 is formed on a flange 44 which serves as an attaching flange of the casting 6 and by means of which the casting is secured to the motor through the medium of screws 45. Figures 1, 2 and 4 clearly show the manner of attachment.

It may be here noted that the inlet and outlet ducts 41 and 42 for the oil pump are continued in the walls of the engine casting and the oil is circulated by means of the pump 5 through these ducts in the usual manner. Moreover, when the casting 6 is in place upon the engine, the chamber 12 is in communication through ducts 46 and 47 with the interior of the crank case or with some other suitable source of lubricant supply, so that, in practice, the chamber 12 is at all times flooded with oil and the gears 20 and 33 run in this lubricant. Thus, not only the gears are properly lubricated, but the lubricant works along the shafts and spindles on which the gears are mounted and serves to properly lubricate all of the working parts.

In practically carrying out this invention, the water pump, timer, oil pump and generator are all assembled on the supporting unit or casting 6, and thereafter the whole picked up as a unit and secured to the engine by means of the screws 45. The mere act of screwing the casting 6 in place on the motor serves to connect the oil ducts referred to so that it only remains to make the connections to the water pump and connect the stub shaft 11 through suitable means to the crank or cam shaft of the engine. The inlet 48 to the water pump is placed into communication with the radiator with a piece of piping and the use of flexible connections, not shown, while the outlet 49 is directly connected to the jacket of the motor, preferably through the use of a flexible connection.

In the preferred embodiment of this invention, the stub shaft 11 is driven from the crank shaft through suitable gearing, contained in a casing 50, and this gearing is coupled to the stub shaft 11 through a connecting rod 51; the rear end of which is provided with a coupling element 52, as shown in Figure 1. The adjacent end of the stub shaft 11 is provided with a coupling member 53 and these two coupling members are bolted together by bolts 54 to provide a driving connection between the two shafts. By providing a readily detachable connection as shown, the shaft 11 may be readily coupled or uncoupled to the connecting shaft 51 during the initial assembling operations or for subsequent repair or overhauling of the engine. Although it is not essential to this invention, the fan, not shown, may be readily driven from the coupling shaft 51 through a belt 55, as this provides a simple and efficient construction for carrying on its purpose.

It will be noted that the adjuncts of the engine which are mounted on the supporting member 6 are driven by the shafts 11 and 51 which are entirely independent of the cam shaft of the motor although, if desired, the shaft 51 may be driven from the cam shaft. This construction makes it possible for one or more workmen to work upon the motor during the assembling of the motor and the timing of its cam shaft, while one or more additional workmen may be operating in another portion of the factory at a bench on the assembly of the motor adjuncts. After they have been assembled and the motor otherwise completed, the adjuncts assembled on the supporting member 6, are brought to the motor and assembled thereon as a unit with ease and celerity. It will be manifest, moreover, to those skilled in the art that the various motor adjuncts may be far more readily and easily assembled on a bench than could possibly be the case in their assemblage directly on the motor, since the workmen find the parts more accessible and the use of ordinary wrenches can be availed of, whereas special wrenches are required to assemble the parts directly on the motor.

It will be apparent from the foregoing that a job of the character under consideration may be accomplished with the aid of the present invention in practically half the time required by previous methods.

It will be understood that changes in form and details, such as the substitution of equivalents, may be made in the structure described without materially departing from the invention, the scope of which is commensurate with the appended claims.

Moreover, parts of the specific invention described may be used, either alone, or in other environments, without departing from the spirit and principle of the invention.

Having thus fully described the invention, what I claim as new and desire to secure by Letters Patent is:

1. Motor assemblage of the character described embodying a supporting element co-operable with a motor and provided with a chamber adapted to contain a lubricant, a plurality of motor adjuncts supported on said element, and driving gears for at least one of said adjuncts positioned within the lubricant chamber, said supporting element being independent of the crank case of the motor and removable from the motor without necessitating the dismantling of any part of the crank case.

2. Motor assemblage of the character described embodying a casting cooperable with a motor and having a surfaced face adapted to cooperate with a corresponding face formed on the motor, a plurality of adjuncts mounted on the casting and one of which is an oil pump, said casting being cored out to provide passages leading to and from the oil pump and to the surfaced face of the casting, whereby they are adapted to register with oil supply and inlet ducts formed in the motor and extending to said surfaced face thereof.

3. Motor assemblage of the character described embodying a supporting element adapted to be mounted on a motor, a plurality of motor adjuncts carried by the supporting element, an operating shaft associated with each adjunct and all of which operating shafts are journalled in the supporting element, said supporting element being independent of the crank case of the motor and removable from the motor without necessitating the dismantling of any part of the crank case.

4. Motor assemblage of the character described embodying a supporting element for a plurality of the adjuncts, means mounting the supporting element in position on a motor to support said member and all of its adjuncts as a unit thereon, and means for operating said adjuncts, said supporting element being mounted on the side of the motor to leave the ends of the crank case unobstructed by such adjuncts.

5. Motor assemblage of the character described embodying a supporting element co-operable with a motor and independent of the motor crank case, a plurality of motor adjuncts mounted on said supporting element, an operating shaft associated with each adjunct and journalled in the supporting element, whereby all of said adjuncts are adapted to be operatively assembled on the supporting element at a bench, said supporting element and associated adjuncts being thereafter mounted as a unit on a motor, and means for mounting the supporting member on the motor, said supporting element being demountable from the motor without dismantling any part of the crank case of the motor.

6. Motor assemblage of the character described embodying a chambered supporting element, a plurality of motor adjuncts mounted on said supporting element, gearing for operating certain of said adjuncts which gearing is positioned within the chamber of the supporting element, and means for mounting the supporting element with its associated adjuncts as a unit upon the side of a motor, to leave the ends of the motor crank case unencumbered by said adjuncts, with the chamber of said element in communication with the lubricating system of the motor, whereby the lubricant fed to said chamber during the operation of the motor serves to lubricate the operating gears of said adjuncts.

7. Motor assemblage of the character described embodying a supporting element independent of the motor crank case, a drive shaft, bearings in the supporting element for said drive shaft, a plurality of motor adjuncts mounted on the supporting element, operative connections between each of said adjuncts and the drive shaft and embodying driven shafts journalled for rotation in the supporting element, and means, independent of the means which hold the parts of the motor crank case assembled, for mounting the whole as a unit on a motor.

8. Motor assemblage of the character described embodying a supporting element independent of and in addition to the constituent parts of the motor crank case, a plurality of motor adjuncts mounted thereon, one of which adjuncts is an oil pump, and means for mounting said supporting member with its associated adjuncts, as a unit, on a motor, said supporting member being provided with inlet and outlet ducts for the oil pump which are adapted to be placed in communication with the lubricating system of the motor when said supporting element is mounted thereon.

9. Motor assemblage of the character described embodying a chambered supporting element, means for mounting a plurality of motor adjuncts on said supporting element, one of said adjuncts embodying an oil pump, and said element being provided with ducts forming an inlet and an outlet for the oil pump, means extending into the chamber of the supporting element for operating the several adjuncts, means for mounting the supporting element with its associated adjuncts, as a unit, on a motor, with the oil ducts and the chamber of said element in communication with the lubricating system of the motor.

10. Motor assemblage of the character described embodying a supporting element independent of an associated motor and adapted to support a plurality of motor adjuncts as a unit, a common shaft, other than the crank shaft of the motor, for operating all of said adjuncts, means for detachably mounting said element with its associated adjuncts on a motor, and driving connections between the motor crank shaft and the common operating shaft of the several adjuncts.

11. Motor assemblage of the character described embodying a supporting member on which is adapted to be mounted an oil pump, an electric generator and a timer, means also mounted on the supporting member for operating the pump, generator and timer, and means for detachably mounting the whole in position on a motor as a unit.

12. Motor essemblage of the character described embodying a supporting member, a water pump, an oil pump, an electric generator and a timer mounted on and supported by said member, means also supported by said member for operating the pumps, generator and timer, and means for detachably mounting the whole on a motor as a unit.

13. A supporting element for a plurality of motor adjuncts embodying a casting, independent of the motor crank case, cored to provide bearings for the operating shafts of the adjuncts adapted to be mounted on the supporting member and chambered to provide a housing for the driving connections between said adjuncts.

14. A supporting element for a plurality of motor adjuncts, one of which is an oil pump, embodying a casting, independent of the motor crank case, cored to provide bearings for the operating shafts of said adjuncts and inlet and outlet feed ducts for the oil pump, said casting being further cored to provide a housing for the operating connections between the said adjuncts.

15. A supporting element for a plurality of motor adjuncts embodying a casting, independent of the motor crank case, provided with attaching flanges whereby the several adjuncts may be secured to the casting and the casting secured to a motor, said casting being cored to provide a housing for the operating connections between said adjuncts and further cored to provide for the circulation of a lubricant through the casting, said casting being demountable from the motor without necessitating dismantling of any part of the motor crank case.

16. In a motor assemblage of the class described a unitary member provided with faces adapted for the following uses, to attach the unitary member to the motor and to mount on the unitary member an electric generator, a timer, an oil pump and water pump, said unitary member being also cored to receive and support a primary power shaft and an auxiliary power shaft, the axes of the two shafts being at right angles.

17. In a motor assemblage of the class described a unitary member provided with faces adapted for the following uses, to attach the unitary member to the motor and to mount on the unitary member an electric generator, a timer, an oil pump and water pump, said unitary member being also cored to receive and support a primary power shaft and an auxiliary power shaft, the axes of the two shafts being at right angles, said unitary member being also cored with conduits to receive oil from the crank case and to transmit said oil through said oil pump back to the crank case.

18. In a motor assemblage of the class described the combination of the following elements; a unitary member provided with faces adapted for the following uses, to attach the unitary member to the motor and to mount on the unitary member an electric generator, a timer, an oil pump and water pump, said unitary member being also cored to receive and support a primary power shaft and an auxiliary power shaft, the axes of the two shafts being at right angles, said unitary member being also cored with conduits to receive oil from the crank case and to transmit said oil through said oil pump back to the crank case, a primary power shaft suitably mounted within said unitary member and secondary power shaft mounted within said unitary member, the axes of said shafts being substantially at right angles, with means interposed between the said shafts for the transmission of power from the primary to the secondary shafts, said primary shaft being provided at one end with a key member adapted to register with the driven shaft of the generator, and said secondary shaft being provided with key members adapted to register with the driven shaft of the pump and the driven shaft of the timer, with means in like manner to key the water pump to the main shaft and to seal such connections by suitable glands, so that the generator, timer, oil pump or water pump may be assembled or dis-assembled with relation to the power shaft line and keyed thereto in the operation of the assemblage.

Signed by me at Detroit this 4th day of February, 1920.

VINCENT LINK.

Witnesses:
W. W. AUSTIN,
ROY O. GAMBLE.